United States Patent [19]
Taylor, Jr.

[11] 3,739,273
[45] June 12, 1973

[54] SPECTRUM ANALYZER
[75] Inventor: John W. Taylor, Jr., Baltimore, Md.
[73] Assignee: The United States of America as represented by the Secretary of the Army, Washington, D.C.
[22] Filed: Nov. 2, 1971
[21] Appl. No.: 195,885

[52] U.S. Cl. .............................................. 324/77 C
[51] Int. Cl. ............................................... G01r 23/16
[58] Field of Search ............ 324/77 B, 77 C, 77 CS

[56] References Cited
UNITED STATES PATENTS
3,074,014   1/1963   Ross .................................. 324/77 C Primary Examiner—Benjamin A. Borchelt
Assistant Examiner—G. E. Montone
Attorney—Harry M. Saragovitz, Edward J. Kelly, Herbert Berl and Robert C. Sims

[57] ABSTRACT

This spectrum analyzer will measure phase as well as amplitude of the spectral components of a signal. This is done by measuring the phase difference between the spectral components which are separated by a fixed frequency. The input signal is mixed with a swept frequency of a local oscillator and the two components resulting therefrom are amplified and further mixed to obtain a frequency which is the difference of the two. This difference in frequency is measured by phase detectors so as to give a reading of the phase dispersion of the spectral components of the input signal.

4 Claims, 1 Drawing Figure

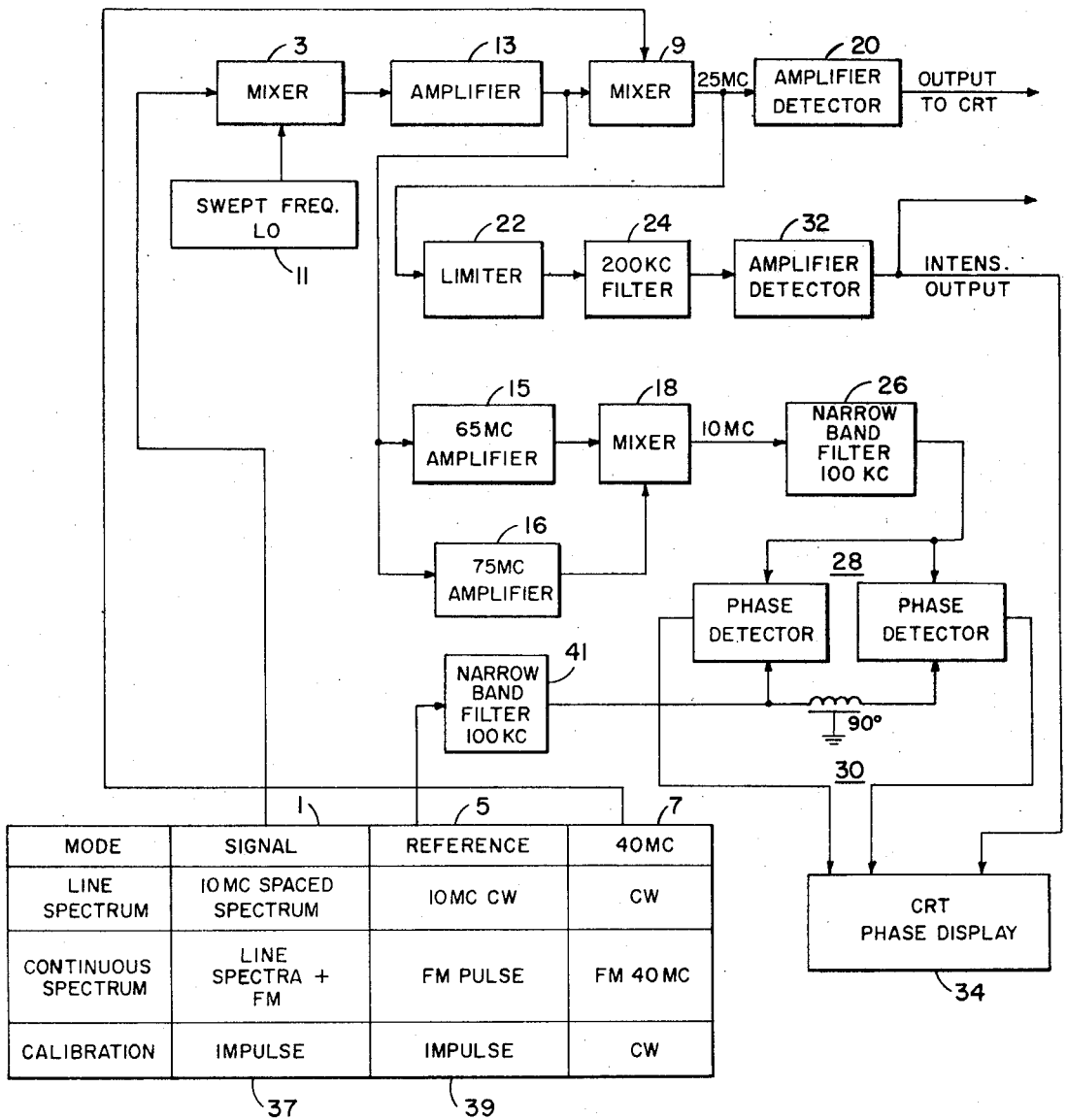

SPECTRUM ANALYZER

BACKGROUND OF THE INVENTION

This invention is related to the field of spectrum analyzers. More specifically this invention is related to the field of analyzing a spectrum which may be a continuous spectrum or a line spectrum. None of the prior art devices will in a single model present the capability of analyzing a superposition of a line spectrum with 10 Mc spacing and a FM pulse scanning 10 Mc and will analyze line spectrum even in the presence of a FM stretched pulse.

SUMMARY OF THE INVENTION

The operation of the invention will be first explained when it is set to measure line spectra. The signal to be measured is a line spectrum with 10 Mc spacing between lines. This signal is mixed with a local oscillator signal whose frequency is a linear function of time covering the frequency range of the input spectrum plus the IF frequency. When the swept local oscillator is greater than any but the lowest spectrum frequency, two frequency outputs will be obtained which are 10 Mc apart. These signals are amplified and mixed to produce the 10 Mc signal which provides information on the relative phase between pair of adjacent spectral lines. The signal from the first mixture is further mixed with a third mixer which has a reference signal therein. The output is amplified and gives a signal proportional to the amplitude of a spectrum line. This signal is used to vertically deflect a cathode ray tube. The horizontal deflection is produced by a voltage analog of the local oscillator frequency. The output of the third mixture can also be limited, filtered, and amplified to produce a signal which will intensify the cathode ray tube approximately ± 100 KC about the center of a spectral line. The phase of the signal from the second mixture is measured by phase detectors using in-phase and quadrature reference signals. The reference signals are phase locked to the spectral lines. The two outputs vertically deflect a second cathode ray tube (dual trace) which has the same horizontal deflection and intensification as the amplitude display cathode ray tube. A precalibrated phase shifter in the reference line may be used to calibrate phase detector characteristics, so that some non-linearity can be tolerated. In the continuous spectrum mode the invention can measure line spectra of specific line spacings for which it is designed. The spacing can be 10mc or any sub-multiple of 10 Mc. Signals limited in time duration (pulsed) require a phase reference only for the duration of the signal. Signals continuous in time require a continuous phase reference which is some multiple of the repetition rate.

This spectrum analyzer is capable of measuring peculiar forms of continuous spectra, in particular it can measure relative phase and amplitude of the combined line and FM pulse spectrum. To do this the local oscillator input to the mixer in the amplitude section is a FM pulse with timing and FM rate such that the output of the mixer is a constant frequency pulse. The frequency to the third mixer will also be a pulse frequency. The signal is now processed as set forth above to produce amplitude and intensification information along with phase information.

To calibrate the system an impulse generator is built in to provide a calibration signal. This signal has a flat spectrum and linear phase relation. The amplitude display would ideally be flat. Any deviation would be caused by an error in the analyzer and may be used as a correction factor. The two bands of frequency separated by 10 Mc are compared by the phase measuring circuitry as usual. Any deviation from a linear relationship across the band is used as a correction factor for phase measurements.

BRIEF DESCRIPTION OF THE DRAWING

The single FIGURE is a detail block diagram showing the preferred embodiment of the invention.

DESCRIPTION OF THE PREFERRED EMBODIMENT

Referring to the figure a signal from a source 1 to be measured is fed into mixer 3 the signal 1 may be one which has line spectra of uniform spacing or continuous spectra covering a large bandwidth compared with the spacing. A peculiarity of this invention is that it is capable of analyzing an unusual form of spectrum which is a superposition of a line spectrum with constant spacing and a FM pulse scanning of the same spacing. It will even analyze the line spectrum in the presence of a FM stretched pulse.

A line spectrum is one whose dominant energy is concentrated at discrete frequencies, and the signal repeats in time. Any further modulation (amplitude or phase) repeats after some integer number of (0.1 us) intervals and creates only modest broadening of each line. The lines are clearly discernible. A continuous spectrum is one not having discernible lines. For example, a 10 MHz FM has filled in the space between lines. Although, if the FM is repeated at fixed intervals, PRE lines exist in the spectrum, these are too closely spaced to be resolved by the spectrum analyzer.

When the signal 1 is a 10 Mc spaced spectrum the reference 5 will be a 10 Mc continuous wave frequency. The input 7 to mixer 9 will be a 40 Mc continuous wave frequency. The signal 1 is fed to mixer 3 where it is mixed with a swept frequency from local oscillator 11. This is amplified by amplifier 13 and sent to mixer 9 and to fixed frequency amplifiers 15 and 16. Local oscillator 11 is a conventional oscillator whose frequency is a linear function of time, covering the frequency range of the input spectrum plus the intermediate frequency (in this case, 65 Mc). When the swept local oscillator is 65 Mc greater than any but the lowest spectrum frequency, both a 65 and 75 Mc signal will be present in the output of mixer 3, since in this example the spectrum lines are separated by 10 Mc. The 65 and 75 Mc signals are separated and amplified by amplifiers 15 and 16 and mixed by mixer 18 to produce a 10 Mc signal which provides information on the relative phase between pairs of adjacent spectral lines. In addition the 65 Mc signal provides oscilloscope intensification and relative amplitude information. The amplitude and intensification is provided by mixing the 65 Mc signal with that of the 40 Mc signal in mixer 9. This produces an output of 25 Mc which is amplified and detected by 20 giving a signal proportional to the amplitude of a spectral line. This signal is connected to vertically deflect a cathode ray tube not shown. The horizontal deflection is produced by a voltage analog of the local oscillator frequency. The 25 Mc signal is also limited by limitor 22 and filtered by filter 24 so as to produce a signal which when connected to the cathode ray tube will intensify it approximately ± 100 KC about a center of a spectral line.

The phase of the signal derived from mixer 18 is independent of local oscillator phase since this is common to both and subtracts out in the mixing. There may be a phase difference in the two signal paths but this does not cause an error in the relative phase measurements; since it is equivalent to a linear phase shift across the band. The output of mixer 18 is fed through a narrow band filter 26. The phase of the 10 Mc is measured in conventional phase detectors 28 using inphase and quadrature reference signals. The reference signals 5 are phase locked to the spectral lines. The two outputs 30 vertically deflect a second cathode ray tube (dual trace) which has the same horizontal deflection and intensification as the amplitude display. One function of the intensification output from amplifier 32 is to cause the display 34 to brighten only during the short period of time that a valid pulsed signal exists in the system. At other times, the phase detector produces an output on noise but the phosphor of the display is not excited. Both the intensification and phase detector outputs are video pulses. The fact that they are detected from different frequencies is of no consequence; the important feature is that they produced valid data at the same instant of time. A second function of the intensification pulse is to produce a visible display only when the swept oscillator 11 is sampling one of the discrete lines of the line spectrum. The display 34 is a series of dots, one for each 10 MHz frequency line. There are three displays with frequency as the abscissa; the ordinates are amplitude or one of the two phase components. The intensification pulse is used for all three displays, on a standard cathode ray tube.

The invention is capable of measuring line spectrum of specific line spacings for which it is designed; in the example, the spacing can be 10mc or any sub-multiple of 10 Mc. A somewhat similar limitation applies to the measurement of continuous spectra. The 10 Mc reference signal for the phase detectors must be phase coherent with some harmonic of the repetition frequency of the signal being analyzed, but this may be derived from a train of impulses at the repetition frequency.

Two types of continuous spectra may be considered:

1. Signals limited in time duration (pulsed) require a phase reference only for the duration of the signal. The narrow band filter shown in the frequency channel is impulsed at the repetition rate and can ring for many pulse lengths without retaining significant energy the next time it is impulsed. Under this condition, the parameters of the Spectrum Analyzer restrict maximum pulse length and maximum repetition rate of the input signal, but the repetition rate can be of arbitrary value within this restriction.

2. Signals continuous in time require a continuous phase reference which is some multiple of the repetition rate. If such a signal is not available in the equipment being analyzed, it may be generated by the impulse technique. However, now the narrow band filter must have a very narrow bandwidth so that it will ring until the next impulse is received, and successive impulses will not be additive unless a repetition frequency harmonic lies within the narrow passband. Under this condition, the parameters of the spectrum analyzer restrict the repetition frequency to specific values.

The spectrum analyzer is also capable of measuring peculiar forms of continuous spectra; in particular it can measure relative phase and amplitude of the combined line and FM pulse spectrum. When preforming this function the LO 11 input to mixer 3 in the amplitude section is a 40 Mc FM pulse, with timing and FM rate such that the output of the mixer is a constant 25 Mc pulse. This is processed as above to produce amplitude and intensification information of the signal 1. Because of the continuous input spectrum, two 1 Mc bands of frequencies separated by 10 Mc, as selected by amplifiers 15 and 16, are mixed in mixer 18 of the phase section. The mixer output is fed to one of two matched narrow band filters. Because of the narrow bandwidth of filter 26 the mixer output signal appears as a very short pulse. The filter therefore rings for about 10 usec with a phase determined by the average difference in the 65 and 75 Mc signals. Reference 5 for the phase detector 28 is phase coherent with a harmonic of the repetition frequency of the signal being analyzed. If the signal source does not provide this 10 MHz signal, it may be derived from a train of impulses at the repetition frequency. A crystal filter, not shown, at 10 MHz can filter this train of impulses to generate the desired reference 5. The phase detector output 30 is again displayed as a function of frequency.

CALIBRATION

The system described may be subject to errors caused by amplitude and distortions in the input mixer. A calibration procedure to be described will allow these errors to be subtracted out. The narrow band filters in the test phase and reference phase lines are not important in line spectrum measurement and will be covered later.

An impulse generator 37 serves as a calibration signal source. A commercially available type which produces a 0.01 nanosecond pulse with a spectrum from 1 KC to 10 GC is used. This signal has a flat spectrum and linear phase relation. The amplitude display would ideally be flat. Any deviation is caused by an error in the analyzer and may be used as a correction factor. An impulse generator 39 in the reference 5 provides a 10 Mc impulse output which passes through filter 41 and is compared with the 10 Mc output of 26 by the phase detectors 28. Any deviation from a linear relationship across the band is used as a correction factor for the phase measurements.

In summary a novel spectrum analyzer has been described which is capable of measuring phase as well as amplitude of the spectral components of a signal, more specifically, the phase difference between spectral components separated by a fixed frequency. The example described was developed for analysis of a particularly wide bandwidth spectrum. For other bandwidths, the choice of frequencies would be entirely different, but the same technique is applicable to all frequency bands and spectrum bandwidths.

I claim:

1. A spectrum analyzer comprising a signal to be analyzed having line spectra; an oscillator having swept frequency output; a first mixer; said signal and the output of the oscillator being connected to said mixer so as to be mixed thereby and to produce first and second frequency outputs combined; first and second amplifiers; said amplifiers each connected to said mixer and passing respectively one of the first and second frequency outputs; a second mixer having inputs connected to outputs of said amplifiers so as to produce a third frequency output which is the difference of said first and second frequencies; reference frequency means having a frequency equal to said third frequency output and being phase related to said signal to be analyzed; and phase detector connected to said reference frequency and to the output of said second mixer so as to detect the phase difference therebetween.

2. An analyzer as set forth in claim 1, further comprising a third mixer having two inputs and an output; a frequency source having an output connected to one of the inputs of said third mixer; the output from said first mixer being connected to the other input of the third mixer so as to produce a fourth frequency at the output of said third mixer; and an amplitude detector connected to the output of said third mixer.

3. An analyzer as set forth in claim 2, further comprising a cathode ray tube device having a intensification circuit, said phase detector having an output connected to drive said cathode ray tube device; and an amplifier means connecting the output from said third mixer to the intensification circuit of said cathode ray tube device.

4. An analyzer as set forth in claim 3, wherein said signal to be analyzed contains line spectra and frequency modulation; said reference signal being a frequency modulated pulse; and said frequency source being a frequency modulated pulse source.

* * * * *